(12) United States Patent
Doll et al.

(10) Patent No.: US 11,400,795 B2
(45) Date of Patent: Aug. 2, 2022

(54) AIR VENT

(71) Applicant: Faurecia Innenraum Systeme GmbH, Hagenbach (DE)

(72) Inventors: Volker Doll, Ranschbach (DE); Stephane Londiche, Montmagny (FR); Julien Seiller, Munich (DE); Martin Schulz, Karlsruhe (DE)

(73) Assignee: FAURECIA INNENRAUM SYSTEME GMBH, Hagenbach (DE)

(*) Notice: Subject to any disclaimer, the term of this patent is extended or adjusted under 35 U.S.C. 154(b) by 356 days.

(21) Appl. No.: 16/228,145

(22) Filed: Dec. 20, 2018

(65) Prior Publication Data

US 2019/0118621 A1 Apr. 25, 2019

Related U.S. Application Data

(63) Continuation of application No. 14/887,055, filed on Oct. 19, 2015, now Pat. No. 10,195,924, and a (Continued)

(30) Foreign Application Priority Data

May 29, 2013 (DE) .......................... 102013210053.1

(51) Int. Cl.
B60H 1/34 (2006.01)
F24F 7/04 (2006.01)
F24F 13/072 (2006.01)

(52) U.S. Cl.
CPC .......... B60H 1/3421 (2013.01); B60H 1/345 (2013.01); B60H 1/3414 (2013.01); F24F 7/04 (2013.01);
(Continued)

(58) Field of Classification Search
CPC .. B60H 1/00564; B60H 1/00871; B60H 1/34; B60H 1/3414; B60H 1/345;
(Continued)

(56) References Cited

U.S. PATENT DOCUMENTS 3,101,038 A 8/1963 Archer
3,908,528 A 9/1975 Bertin et al.
(Continued)

FOREIGN PATENT DOCUMENTS

DE 102006032587 A1 1/2008
DE 102007019602 B3 6/2008
(Continued)

OTHER PUBLICATIONS

Office Action and English translation for corresponding DE Application No. 102013210053.1, dated Dec. 9, 2013, 5 pages.

Primary Examiner — Avinash A Savani
Assistant Examiner — Dana K Tighe
(74) Attorney, Agent, or Firm — Reising Ethington P.C.

(57) ABSTRACT

An air vent includes a housing, an air guide surface, an air flow adjusting element, and a vane. The air guide surface at least partially defines an air duct configured to convey a volumetric flow of air through the housing so that the volumetric flow of air exits the air duct in a direction that at least partially defines an air discharge direction perceived outside of the air vent. The air flow adjusting element is moveable to vertically change the perceived air discharge direction, and the vane is movable to horizontally change the
(Continued)

perceived air discharge direction. The vane is not visible to a user of the air vent when the air vent is viewed from an air outlet end of the housing.

19 Claims, 3 Drawing Sheets

Related U.S. Application Data continuation of application No. 14/257,344, filed on Apr. 21, 2014, now Pat. No. 9,163,848.

(52) U.S. Cl.
CPC .... *F24F 13/072* (2013.01); *B60H 2001/3492* (2013.01)

(58) Field of Classification Search
CPC .......... B60H 2001/00092; B60H 2001/00214; B60H 2001/3478; B60H 2001/3492; B60H 1/3421; F24F 7/04; F24F 13/072; F24F 13/075
USPC ................ 454/143, 152, 153, 154, 155, 284
See application file for complete search history.

(56) References Cited

U.S. PATENT DOCUMENTS

| 4,345,510 | A  | 8/1982  | Sterett |
| 5,356,336 | A  | 10/1994 | Stouffer et al. |
| 6,059,652 | A  | 5/2000  | Terry et al. |
| 6,715,814 | B1 | 4/2004  | Hoyle |
| 7,604,533 | B2 | 10/2009 | Ogura et al. |
| 9,163,848 | B2 | 10/2015 | Doll et al. |
| 2004/0152412 | A1 | 8/2004 | Gehring et al. |
| 2008/0014855 | A1 | 1/2008 | Leserre |
| 2008/0081550 | A1 | 4/2008 | Shibata et al. |
| 2008/0146139 | A1 | 6/2008 | Terai et al. |
| 2010/0011799 | A1 | 1/2010 | Sakakibara |
| 2010/0130115 | A1 | 5/2010 | Miki |
| 2010/0263401 | A1 | 10/2010 | Sakakibara et al. |

FOREIGN PATENT DOCUMENTS

| DE | 102011003433 A1 | 8/2012 |
| DE | 102011003435 A1 | 8/2012 |
| EP | 1331116 A2 | 7/2003 |
| FR | 2872260 A1 | 12/2005 |

AIR VENT

TECHNICAL FIELD

The invention relates to an air vent for vehicles.

BACKGROUND

Various air vents are known from the prior art. DE 10 2006 032587 A1, for example, discloses an air outlet device for vehicles, which comprises—as viewed in a longitudinal or vertical section—an air duct having a first, upper wall region and, facing this, a second, lower wall region, and which is fluidically connected via an air outlet opening to a passenger compartment of the vehicle. Air can be directed into the passenger compartment via the air duct and the air outlet opening. At least one louver-type air guide element is disposed between the two wall regions in the region or the vicinity of the air outlet opening.

SUMMARY

Embodiments of an air vent include a housing having an inner wall, an air guide surface located in the housing, an air flow adjusting element, and a vane. The air guide surface is facing toward and spaced away from the inner wall of the housing to at least partially define an air duct configured to convey a volumetric flow of air through the housing. The air duct is arranged so that the volumetric flow of air exits the air duct in a direction that at least partially defines an air discharge direction perceived outside of the air vent. The air flow adjusting element is located along the air duct and is moveable to vertically change the perceived air discharge direction. The van is located along the air duct and is movable to horizontally change the perceived air discharge direction. The vane is not visible to a user of the air vent when the air vent is viewed from an air outlet end of the housing.

In various embodiments, the air flow adjusting element is not visible to the user of the air vent when the air vent is viewed from the air outlet end of the housing.

In various embodiments, the air guide surface is in a fixed position with respect to the housing.

In various embodiments, the direction in which the volumetric flow of air exits the air duct is defined in part by the shape of the air guide surface and by the shape of the inner wall of the housing such that movement of the air flow adjusting element does not change the direction in which the volumetric flow of air exits the air duct.

In various embodiments, the air flow adjusting element and/or the vane is pivotably attached along the air duct.

In various embodiments, the air vent includes a second air guide surface located in the housing. The second air guide surface faces toward and is spaced away from the inner wall of the housing to at least partially define a second air duct configured to convey a second volumetric flow of air through the housing. The air ducts are separate from each other and arranged so that the volumetric flows of air exit the air ducts in respective intersecting directions and collide after exiting the air ducts. The air flow adjusting element is movable to change a ratio of the volumetric flows of air to thereby vertically change the perceived air discharge direction.

In various embodiments, the air flow adjusting element is movable to adjust a second volumetric flow of air conveyed through the housing by a second air duct.

In various embodiments, the air vent includes air guide surfaces that face in opposite directions.

In various embodiments, each air guide surface is parallel with the inner wall of the housing along each of the air ducts.

In various embodiments, the vane is one of a plurality of vanes and at least one of the plurality of vanes is located along each one of the air ducts. Each vane is moveable to horizontally change the perceived air discharge direction, and each vane is non-visible to the user of the air vent when the air vent is viewed from the air outlet end of the housing.

In various embodiments, the air vent includes third and fourth air ducts located between air guide surfaces. The third and fourth air ducts are configured to convey respective third and fourth volumetric flows of air through the housing. Each air flow adjusting element is moveable to adjust a ratio of at least one volumetric flow of air to at least another volumetric flow of air.

In various embodiments, the inner wall of the housing has a rectangular shape when viewed from the air outlet end of the housing.

In various embodiments, the air vent includes an illuminator located along the air duct in the housing.

In various embodiments, a manipulator at the air outlet end of the housing is operatively coupled to the air flow adjusting element to move the air flow adjusting element.

In various embodiments, a manipulator at the air outlet end of the housing is operatively coupled to the vane to move the vane.

In various embodiments, a manipulator at the air outlet end of the housing is operatively coupled to the air flow adjusting element and to the vane to move the air flow adjusting element and the vane to thereby vertically and horizontally change the perceived air discharge direction with the same manipulator.

It is understood that the above-described embodiments can be combined with one another in any manner, provided the combinations do not cancel each other out.

BRIEF DESCRIPTION OF THE DRAWINGS

Preferred embodiments of the invention are explained in the following in greater detail by reference to the drawings. In the drawings.

DETAILED DESCRIPTION

Elements that are similar to one another are labeled with the same reference signs in the following.

Figure 1:
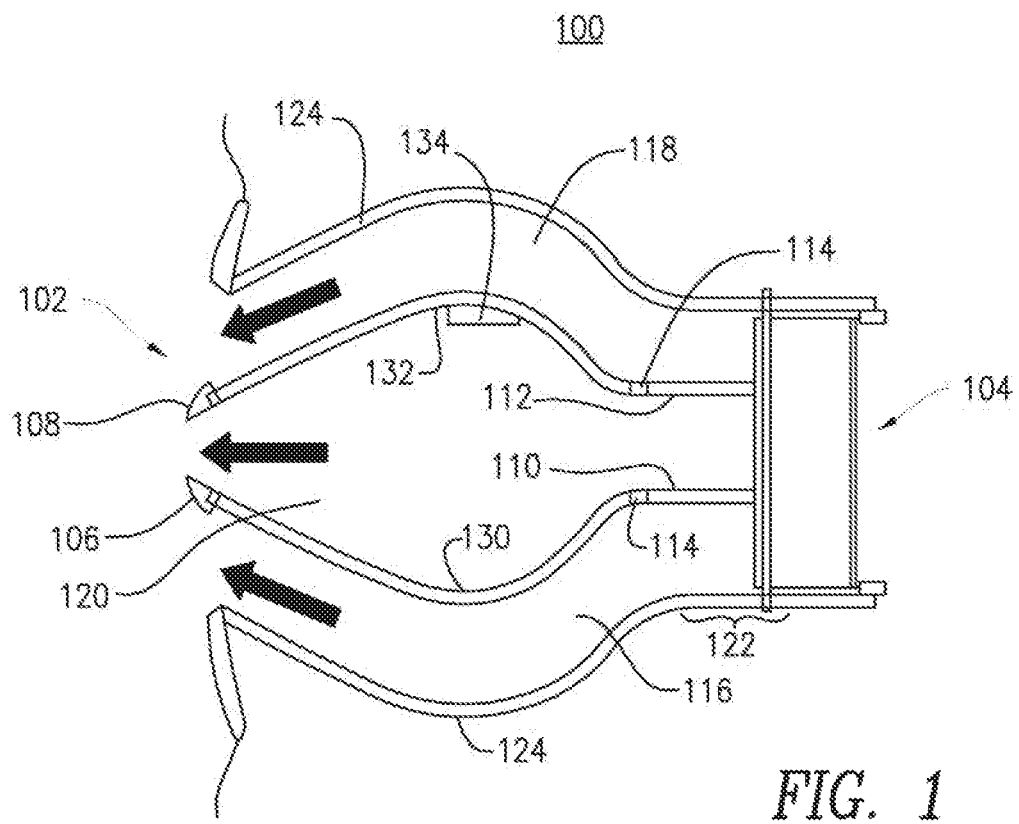
FIG. 1 shows a schematic view of an air vent.

FIG. 1 shows a schematic view of an air vent 100 comprising a housing 124. The air vent has an air inlet opening 104, which is disposed in the axial direction of the housing, and a corresponding air outlet opening 102. The air inlet opening 104 and the air outlet opening 102 are disposed opposite one another as viewed in the axial direction of the housing 124.

Air guide surfaces 106 and 108, which are located in the housing 124, are also clearly shown. Both air guide surfaces 106 and 108 have rounded bulges 130 and 132, respectively, which point in opposite directions, namely vertically upward and downward in FIG. 1. These two directions are opposed to one another and extend perpendicularly to the axial direction of the housing 124. The air guide surfaces 106 and 108 are disposed at a distance from the inner side of the housing 124, thereby forming an air duct 116 between the air guide surface 106 and the interior of the housing 124 and, analogously, an air conduit 118 is formed between the air guide surface 108 and the interior of the housing 124. The inner side of the housing 124 extends parallel to the shape of the air guide surfaces 106 and 108.

A further air duct 120 is formed between the air guide surfaces 106 and 108. If air then flows into the housing 124 from the air inlet opening 104, this air will then flow through the air ducts 116, 118 and 120, as indicated by the directions of the arrows in FIG. 1, and will emerge from the air outlet opening 102. The emerging volumetric flows will mix in a corresponding manner, and therefore the air flow felt at the air outlet opening 102 will be perceived as an air flow that is directed straight ahead.

In order to change the direction of this emerging air flow in the vertical direction, i.e. to deflect this emerging air flow upwardly or downwardly, a vane 110 or 112 is mounted on the air guide surfaces 106 and 108, respectively, via corresponding axes 114. The vanes 110 and 112 can be swiveled in the direction 200 or opposite the direction 200 by means of the axial hinge-connection thereof; see the example depicted in FIG. 2.

Figure 2:
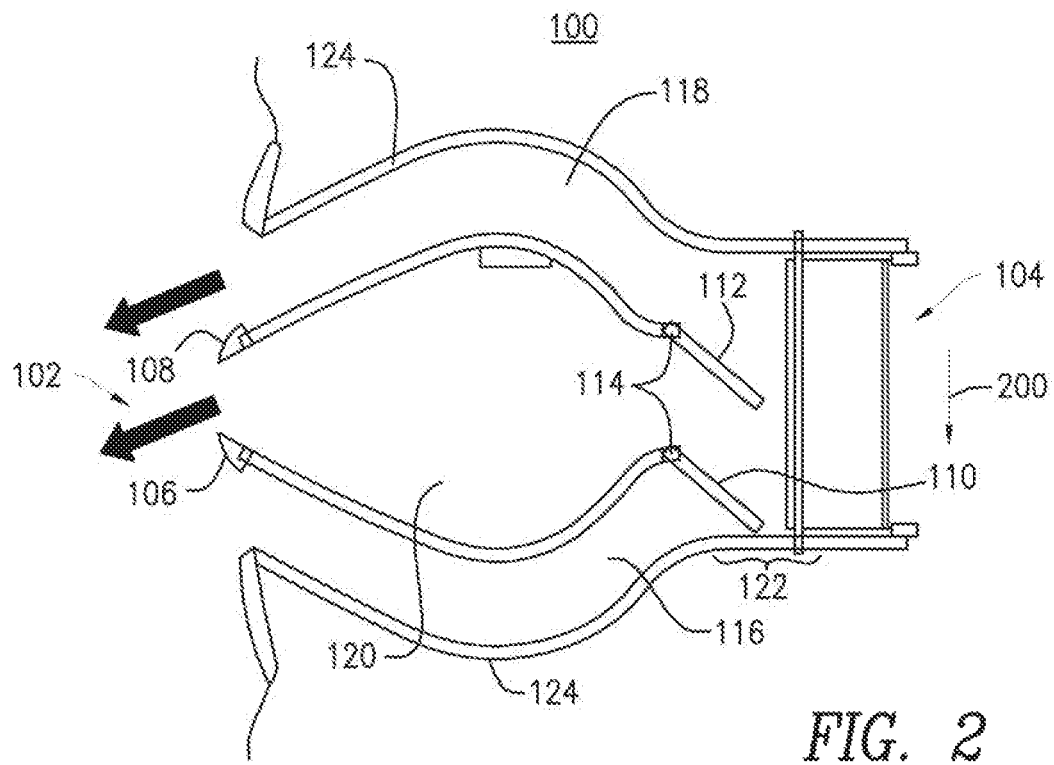
FIG. 2 shows another schematic view of the air vent from FIG. 1.

In FIG. 2, the vanes were swiveled downward about the axis 114 in the direction 200. As a result, the lower air duct 116 was completely closed by the vane 110. The air entering the housing 124 through the air inlet opening 104 can therefore flow only through the air ducts 120 and 118. Due to the bulged shape thereof, and due to the downward slant of the vane 112, the air flow emerging from the air outlet opening is oriented in the downwardly slanted direction.

According to this example, it is therefore possible to control the air flow between various outwardly flowing directions by positioning the vanes 110 and 112 appropriately, without the related air guide components, i.e. the vanes 110 and 112, being visible by an observer from the side of the air outlet opening 102.

This makes it possible, for example, to accommodate an appropriate illumination means 134 within the housing 124, which can provide diffuse illumination of the air vent 100 in darkness. The illumination provided by the illumination means 134 is consistent regardless of the position of the vane 110 or 112, which can make it easier to operate the air vent 100 from the sides of the air outlet opening 102.

The vanes 110 and 112 and the housing 124 have a rectangular shape in the region 122 of the vanes 110 and 112. This makes it possible to easily implement the swivel motion of the vanes without the vanes and the inner walls of the housing 124 interfering with one another.

Figure 3:
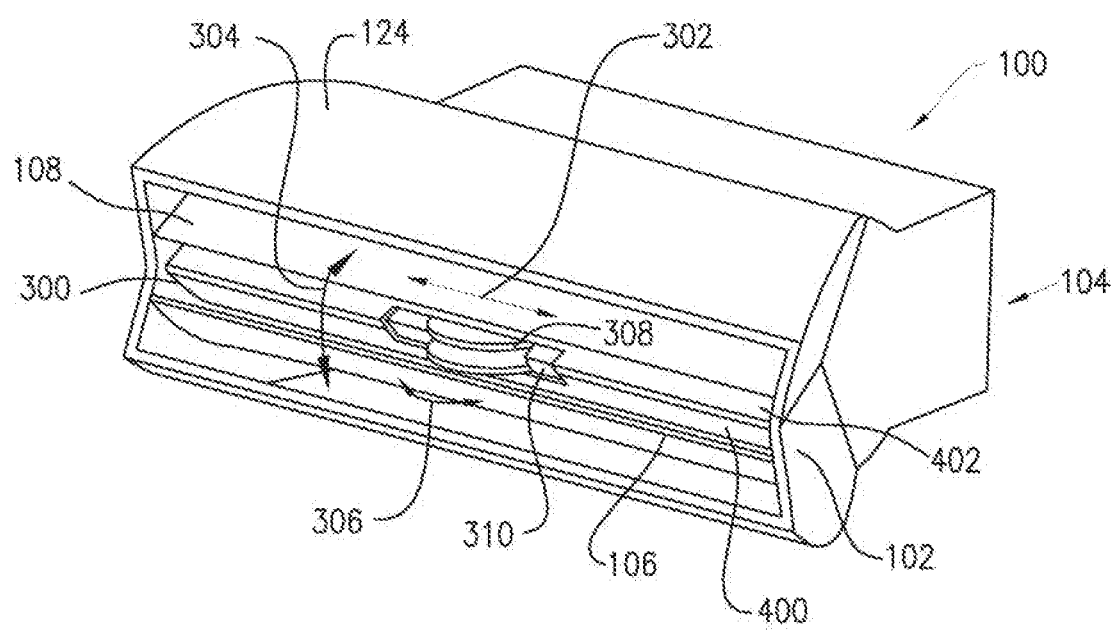
FIG. 3 shows a perspective view of an air vent.
Figure 4:
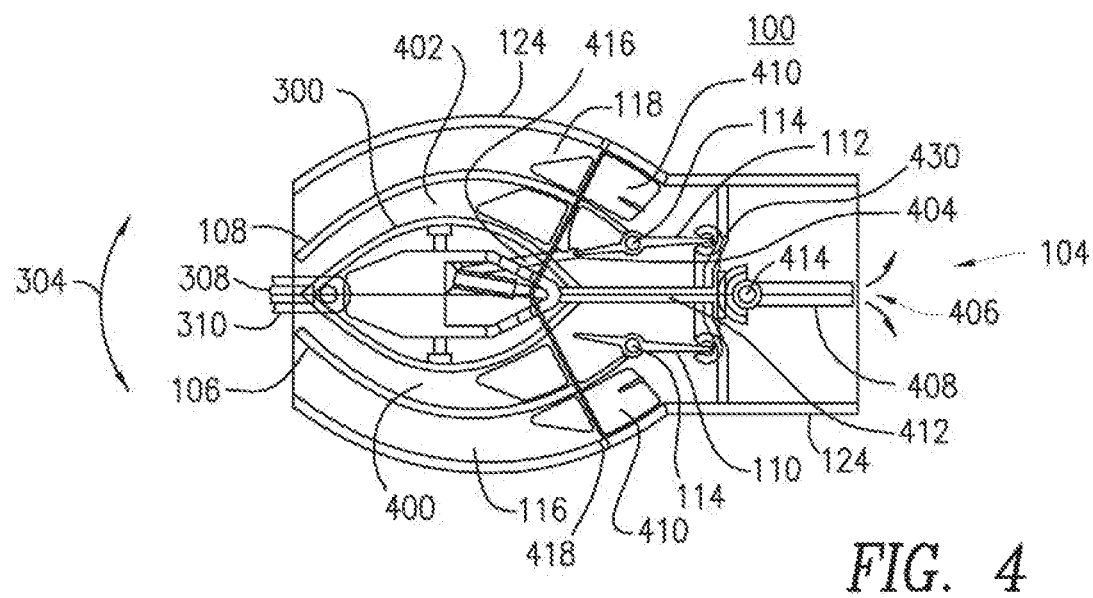
FIG. 4 shows a lateral sectional view of the air vent from FIG. 3.

FIG. 3 shows a further variant of an air vent 100, wherein, as compared to the variant shown in FIGS. 1 and 2, a closed air guide element 300 was selected in this case instead of an air duct between the air guide surfaces 106 and 108. This air guide element, in combination with the air guide surfaces 106 and 108, delimits additional air ducts 400 or 402, as shown in FIG. 4 in particular. Further air ducts 400 and 402 are now provided in addition to the aforementioned air ducts 116 and 118.

FIG. 3 also shows a manipulator 310, which can be swiveled vertically in direction 304 relative to the air guide element 300 rigidly disposed on the housing 124. Furthermore, the manipulator 310 shown in FIG. 3 can be moved in direction 302 horizontally to the left and right relative to the air guide element 300. Finally, the manipulator 310 also comprises a rotatable positioning aid 308, which can be rotated horizontally relative to the the manipulator 310 in direction 306.

FIG. 4 shows a lateral sectional view through the air vent 100 depicted in FIG. 3. In addition to the air guide elements 106 and 108, the vanes 110 and 112 known from FIGS. 1 and 2 are shown once more. These, in turn, are disposed on the air guide elements 106 and 108 by means of axes 114, wherein, in the present case, the axes are not disposed at the ends of the vanes 110 or 112, but rather slightly closer to the center relative to the respective vanes, although not necessarily being centered.

One end of the vane 112 is mechanically connected to the manipulator 310, wherein another end of the vane 112, which is diametrically opposed to this end, is mechanically coupled to the vane 110 via the coupling 430. Movement of the manipulator 310 in direction 304 induces a transfer of force between the manipulator 310 and the vane 112, which induces rotation of the vane 112 about the axis 114 thereof due to the coupling between the manipulator 310 and the end of the vane 112. At the same time, the rotation also induces a displacement of the coupling 430 upwardly or downwardly in the vertical direction and, therefore, a corresponding rotation of the vane 110 about the axis 114 thereof. It is thereby possible to adjust a related volumetric flow through the air ducts 116, 400, 402 and 118.

The mechanical coupling between the manipulator 310 and the end of the vane 112 is implemented, for example, via a corresponding coupling rod 416.

FIG. 4 furthermore shows a closing element 408, which is formed of two plates. These plates are supported on the housing 124 via a common axis 414. By means of a rotational motion of the positioning aid 308 in the horizontal direction, a force can be transferred to the plates of the closing element 408 via the coupling rod 412. By means of this force, the plates can be swiveled in the housing 124 opposite to direction 406. By means of this swivelling, the air inlet opening can be completely closed or opened. One of the plates therefore swivels upwardly in the closing procedure, as shown in FIG. 4, while the other plate swivels downwardly, in direction 406, in the closing procedure.

Figure 5:
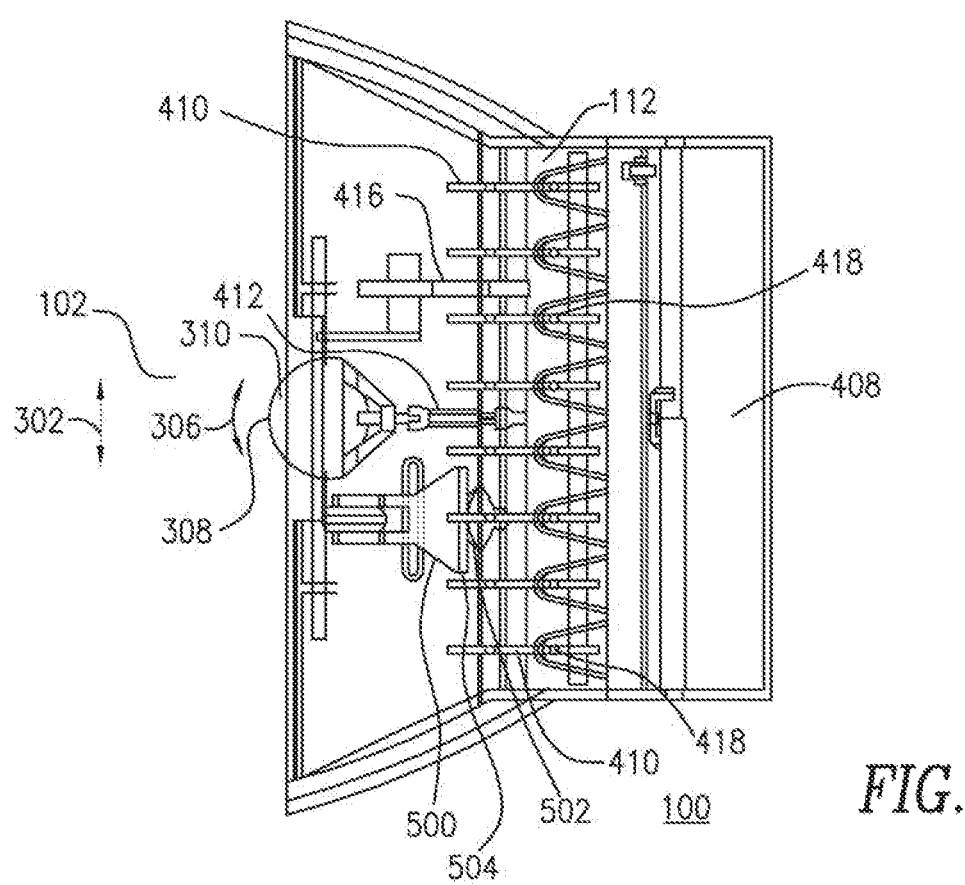
FIG. 5 shows a sectional view of the air vent from FIG. 3, from above.

This procedure and the corresponding mechanical connection are explained in greater detail with reference to FIG. 5. FIG. 5 shows a sectional illustration of the air vent 100 from FIG. 3, from above.

FIG. 5 more clearly shows the positioning aid 308, which can be rotated in direction 306. The rotation occurs relative to the manipulator 310.

Rotation of the positioning aid 308 in direction 306 causes the axis between the positioning aid 306 and the closing element 408 in FIG. 5 to move easily in the horizontal plane. The movement of this axis 412 causes a gearwheel disposed between the axis 412 and the closing element 408 to induce a corresponding rotation of the plates of the closing element 408 about the axis 414. Compensation of the length of the coupling rod 412, which may be required therefor, can be implemented by means of components of the coupling rod 412, which can be slid into one another.

FIG. 4 also shows a set of further vanes 410, which are hinge-connected at an axis 418. The view in FIG. 5 clearly shows that these vanes 410, after rotation about the axis 418, can change the directional characteristic of the air flowing out of the air outlet opening 102. While the vanes 110 and 112, according to FIG. 3, are responsible for a directional characteristic in the vertical direction, the vanes 410 define the directional characteristic of the outflowing air in the horizontal direction.

The orientation of the vanes 410 relative to the housing is induced by the manipulator 310 in that this manipulator is displaced in a translatory manner in the horizontal direction 302. A coupling element 500, which is rigidly connected to the manipulator 310, comprises a toothed rack 504, in which a gearwheel 502 engages. In turn, this toothed rack is rigidly connected to the vanes 410. As a result, when the manipulator 310 moves in direction 302, relative motion between the toothed rack 504 and the gearwheel 502 takes place, which, in turn, induces rotation of the vanes 410 about the axes 418 thereof. It is therefore possible to change the directional characteristic of an emerging air flow in the vertical and horizontal directions by means of a single manipulator.

The invention claimed is:

1. An air vent, comprising:
a housing having an inner wall;
a first air guide surface located in the housing, the first air guide surface facing toward and being spaced away from the inner wall of the housing to at least partially define a first air duct configured to convey a first volumetric flow of air through the housing, the first air duct being arranged so that the first volumetric flow of air exits the first air duct in a first direction that at least partially defines an air discharge direction perceived outside of the air vent;
a second air guide surface located in the housing, the second air guide surface facing toward and being spaced away from the inner wall of the housing to at least partially define a second air duct configured to convey a second volumetric flow of air through the housing;
an air flow adjusting element located along the first air duct and being moveable to change a ratio of the volumetric flows of air to thereby vertically change the perceived air discharge direction; and
a vane located along the air duct and being movable to horizontally change the perceived air discharge direction, wherein the vane is not visible to a user of the air vent when the air vent is viewed from an air outlet end of the housing,
wherein the first and second air ducts are separate from each other and arranged so that the second volumetric flow of air exits the second air duct in a second direction intersecting the first direction so that the first and second volumetric flows of air collide after exiting the air ducts.

2. The air vent as defined in claim 1, wherein the air flow adjusting element is not visible to the user of the air vent when the air vent is viewed from the air outlet end of the housing.

3. The air vent as defined in claim 1, wherein the first air guide surface is in a fixed position with respect to the housing.

4. The air vent as defined in claim 1, wherein the first direction is defined in part by a shape of the first air guide surface and by a shape of the inner wall of the housing such that movement of the air flow adjusting element does not change the first direction.

5. The air vent as defined in claim 1, wherein the air flow adjusting element and/or the vane is pivotably attached along the air duct.

6. The air vent as defined in claim 1, further comprising a second air flow adjusting element located along the second air duct and being movable to adjust the second volumetric flow of air.

7. The air vent as defined in claim 1, wherein the air guide surfaces face in opposite directions.

8. The air vent as defined in claim 1, wherein each of the air guide surfaces is parallel with the inner wall of the housing along each of the air ducts.

9. The air vent as defined in claim 1, wherein the vane is one of a plurality of vanes and at least one of the plurality of vanes is located along each one of the air ducts, each vane being moveable to horizontally change the perceived air discharge direction, and each vane being non-visible to the user of the air vent when the air vent is viewed from the air outlet end of the housing.

10. The air vent as defined in claim 1, further comprising third and fourth air ducts located between the air guide surfaces, the third and fourth air ducts being configured to convey respective third and fourth volumetric flows of air through the housing.

11. The air vent as defined in claim 10, wherein the vane is one of a plurality of vanes and at least one of the plurality of vanes is located along each one of the air ducts, each vane being moveable to horizontally change the perceived air discharge direction, and each vane being non-visible to the user of the air vent when the air vent is viewed from the air outlet end of the housing.

12. The air vent as defined in claim 1, wherein the inner wall of the housing has a rectangular shape when viewed from the air outlet end of the housing.

13. The air vent as defined in claim 1, further comprising an illuminator located in the housing.

14. The air vent as defined in claim 1, further comprising a manipulator at the air outlet end of the housing, wherein the manipulator is operatively coupled to the air flow adjusting element to move the air flow adjusting element.

15. The air vent as defined in claim 1, further comprising a manipulator at the air outlet end of the housing, wherein the manipulator is operatively coupled to the vane to move the vane.

16. The air vent as defined in claim 1, further comprising a manipulator at the air outlet end of the housing, wherein the manipulator is operatively coupled to the air flow adjusting element and to the vane to move the air flow adjusting element and the vane to thereby vertically and horizontally change the perceived air discharge direction with the same manipulator.

17. The air vent as defined in claim 1, wherein the air flow adjusting element is a moveable vane.

18. An air vent, comprising:
a housing having an inner wall;
a first air guide surface located in the housing, the first air guide surface facing toward and being spaced away from the inner wall of the housing to at least partially define a first air duct configured to convey a first volumetric flow of air through the housing, the first air duct being arranged so that the first volumetric flow of air exits the first air duct in a first direction that at least partially defines an air discharge direction perceived outside of the air vent;
a second air guide surface located in the housing, the second air guide surface facing toward and being spaced away from the inner wall of the housing to at least partially define a second air duct configured to convey a second volumetric flow of air through the housing; and an air flow adjusting element located along the first air duct and being moveable to change a ratio of the volumetric flows of air to thereby vertically change the perceived air discharge direction, wherein the first and second air ducts are separate from each other and arranged so that the second volumetric flow of air exits the second air duct in a second direction intersecting the first direction so that the first and second volumetric flows of air collide after exiting the air ducts.

19. The air vent as defined in claim 18, wherein the air flow adjusting element is a moveable vane.

\* \* \* \* \*